United States Patent
Tracht

(10) Patent No.: US 7,962,686 B1
(45) Date of Patent: Jun. 14, 2011

(54) EFFICIENT PRESERVATION OF THE ORDERING OF WRITE DATA WITHIN A SUBSYSTEM THAT DOES NOT OTHERWISE GUARANTEE PRESERVATION OF SUCH ORDERING

(75) Inventor: Allen E. Tracht, Pittsburgh, PA (US)

(73) Assignee: NetApp, Inc., Sunnyvale, CA (US)

( * ) Notice: Subject to any disclaimer, the term of this patent is extended or adjusted under 35 U.S.C. 154(b) by 376 days.

(21) Appl. No.: 12/363,956

(22) Filed: Feb. 2, 2009

(51) Int. Cl.
*G06F 12/00* (2006.01)
*G06F 13/24* (2006.01)

(52) U.S. Cl. . 711/103; 711/106; 711/154; 711/E12.083; 710/260

(58) Field of Classification Search .................. None
See application file for complete search history.

(56) References Cited

U.S. PATENT DOCUMENTS

| 7,895,286 B1 * | 2/2011 | Kilbourne et al. ............ 709/212 |
| 2006/0218362 A1 * | 9/2006 | McManis ....................... 711/162 |
| 2010/0030981 A1 * | 2/2010 | Cook ............................ 711/159 |

* cited by examiner

*Primary Examiner* — Kevin Verbrugge
(74) *Attorney, Agent, or Firm* — Perkins Coie LLP

(57) ABSTRACT

A technique for efficiently preserving the ordering of data being written to a nonvolatile memory through a subsystem of a network storage system in the event of a power disruption, where the subsystem does not inherently guarantee that the ordering of the data will be preserved. The subsystem can be, for example, a memory controller hub. During normal operation of the system, data is written to the nonvolatile memory without flushing the data to the nonvolatile memory. In response to a power disruption in the system, data sources in the system that can initiate write transactions destined for the nonvolatile memory are inhibited from initiating write transactions destined for the nonvolatile memory, and pending write data within the subsystem is allowed to be committed to the nonvolatile memory. The nonvolatile memory is then placed into a self-refresh state.

38 Claims, 5 Drawing Sheets

EFFICIENT PRESERVATION OF THE ORDERING OF WRITE DATA WITHIN A SUBSYSTEM THAT DOES NOT OTHERWISE GUARANTEE PRESERVATION OF SUCH ORDERING

FIELD OF THE INVENTION

At least one embodiment of the present invention pertains to computer systems, and more particularly, to efficient preservation of the ordering of write data within a subsystem that does not otherwise guarantee preservation of such ordering.

BACKGROUND

A conventional computer system includes one or more microprocessors, memory elements and input/output (I/O) devices. Commonly, the microprocessors are coupled to a main memory by a chipset that implements a memory controller hub (MCH), which is sometimes called the "Northbridge". The MCH also provides a connection between the microprocessors and one or more expansion buses.

One type of modern computer system that can have this type of architecture is a network storage server. In at least one known network storage server, the MCH also connects the processors and certain peripheral devices to a nonvolatile random access memory (NVRAM). The NVRAM is used to store a log of write requests and data received from storage clients temporarily, until such write data can be committed to long-term persistent storage (e.g., disks). If a catastrophic failure such as a system power loss occurs before the data has been committed to long-term persistent storage, the correct state of the system can be retrieved by replaying the log from NVRAM.

The NVRAM is typically implemented as battery backed dynamic random access memory (DRAM). As such, the memory devices that make up the NVRAM need to be periodically refreshed, as with other known forms of DRAM. In the event of a system power failure, the NVRAM is placed into an automatic self refresh (ASR) state. Various techniques are known in the art for placing DRAM into an ASR state in the event of a power disruption or failure.

At least one known storage server stores data in a record based format. In this regard, there are two types of records: data records and metadata records. The data is the information which the client has requested to be stored, and the metadata is descriptive information about the data to be stored. In this known storage server, the record structure is made visible to the hardware (the subsystems between the data source and the NVRAM), because the software inserts flushes between records, as required to provide ordered delivery and confirmed data placement (both discussed below) with the limitations of that hardware. A "flush" or "flushing" is an explicit, software-specified operation that moves data out of some portion of the MCH and into the NVRAM (or other subsystem). Such operation can be, for example, a hardware-implemented signal (e.g., setting a bit), a special command, or simply flooding the MCH with enough "dummy" data to ensure that all real data buffered in the MCH is flushed to NVRAM (a technique called "pipe cleaning"). After a power disruption, the system normally examines the metadata records in NVRAM to determine which data records are present in NVRAM.

Two important properties of a storage server are ordered delivery and confirmed placement. "Ordered delivery" refers to the property that all of a given data record is secure in the NVRAM before the metadata record that refers to it enters the NVRAM. If this property is violated, then upon recovery from a power failure, the metadata record might describe data that had not actually been correctly stored, and the retrieval of that incomplete data record would corrupt the system. "Confirmed placement" refers to the property by which an operation that modifies stored data (e.g., writing to a file) may not be acknowledged as complete until all of the data and metadata that describes the operation is secure in the NVRAM. If this property is violated, then the requester might believe that in operation has completed, even though it was lost due to a power failure.

Certain storage servers and other conventional computer systems have design issues associated with these two properties in relation to the MCH (note that the MCH normally is a component purchased by the original equipment manufacturer (OEM) from another vendor). Specifically, a problem associated with such systems is how to maintain the proper ordering of write data that is destined for the NVRAM but still in transit when a system power failure occurs. In at least one known architecture, all data destined for the NVRAM must go through the MCH. The data may originate from the processors or from any of various peripheral devices, such as a network adapter or a cluster interconnect adapter. However, the MCH is not designed to maintain the ordering of data that passes through it. As long as power to the system is maintained and the data in transit through the MCH eventually gets stored in the NVRAM, this is not a problem—data ordering will be correct in the NVRAM. However, a power failure could result in any data that is in transit (i.e., buffered) within the MCH and destined for the NVRAM being stored in NVRAM in the wrong order (or not at all), which could render some or all of that stored data invalid.

Various partial solutions to this problem have been developed. One known approach is to have the source of the data wait for each record to reach the NVRAM before sending the next record. The approach is very inefficient in terms of throughput. Another known approach is to force the NVRAM to accept the data so quickly that no data can be left in the MCH to be delivered out-of-order. This approach is technically difficult and can be expensive to implement.

Yet another known approach is to force each record, as it is generated, to the NVRAM by flushing the record into the memory controller within the MCH, from which it will automatically be saved in the NVRAM in the event of a failure. As an example of this approach, the following sequence of events might occur during normal operation of a storage server (i.e., in the absence of a power disruption or other major fault):

1) Storage server receives a write request from a client.
2) Storage operating system of the storage server writes data record A toward the NVRAM, performing the change requested by the client.
3) Storage operating system flushes data record A to the NVRAM to guarantee ordered delivery.
4) Storage operating system writes metadata record A' toward the NVRAM, relating to record A, so record any can be retrieved after disruption.
5) Storage operating system flushes metadata record A' to the NVRAM to confirm placement of the request.
6) Storage operating system sends an "operation complete" notification to the client.

With this approach, in the event of a power disruption, the system prevents additional transactions from corrupting the NVRAM and uses battery power to preserve the data.

A problem with this approach, however, is that the memory controller is only a small portion of the MCH. A typical MCH includes various data paths outside of the memory controller that also do not preserve the ordering of data in transit. This solution, therefore, is only a partial solution at best. Furthermore, this solution is inefficient, since it requires multiple flushing operations for each data record, which increases processing overhead.

SUMMARY

The technique introduced here efficiently preserves the ordering of data being written to a nonvolatile memory, through a subsystem of a network storage system in the event of a power disruption, where the subsystem does not inherently guarantee that the ordering of the data will be preserved. The subsystem can be, for example, a memory controller hub. In general, during normal operation of the system, data is written to the nonvolatile memory without flushing the data to the nonvolatile memory. In response to a power disruption in the system, data sources in the network storage system that can initiate write transactions destined for the nonvolatile memory are inhibited from initiating write transactions destined for the nonvolatile memory, and pending write data within the subsystem is allowed to be committed to the nonvolatile memory. The nonvolatile memory is then placed into a self-refresh state.

The data to be stored in the nonvolatile memory is presented to the hardware in a continuous stream, without explicit separation of the individual data records; that is, the record structure is not visible to the hardware. The data sources can include a processor as well as one or more other devices, such as one or more peripheral devices coupled to the memory controller hub via a peripheral bus.

This approach is more efficient than known prior techniques (e.g., by enabling simpler, faster CPU operation), since there is no need to flush data during normal operation. Further, this approach can be used to guarantee that data ordering and placement is preserved for all data in transit to the nonvolatile memory in the event of the power disruption.

In certain embodiments, the processor is inhibited from initiating new write transactions destined for the nonvolatile memory, while allowing its pending write transactions to complete, by asserting a Stop Clock signal or a System Management Interrupt (SMI) signal to the processor. In certain embodiments, a peripheral device is inhibited from initiating new write transactions destined for the nonvolatile memory by asserting a reset signal to the device. In certain embodiments, all data buffered within the subsystem is allowed to simply drain to the nonvolatile memory after the power disruption is detected, before placing the nonvolatile memory into the self refresh state. In other embodiments, at least some of the data buffered in the subsystem is flushed to the nonvolatile memory after the power disruption is detected, before placing the nonvolatile memory into the self refresh state.

Other aspects of the technique will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
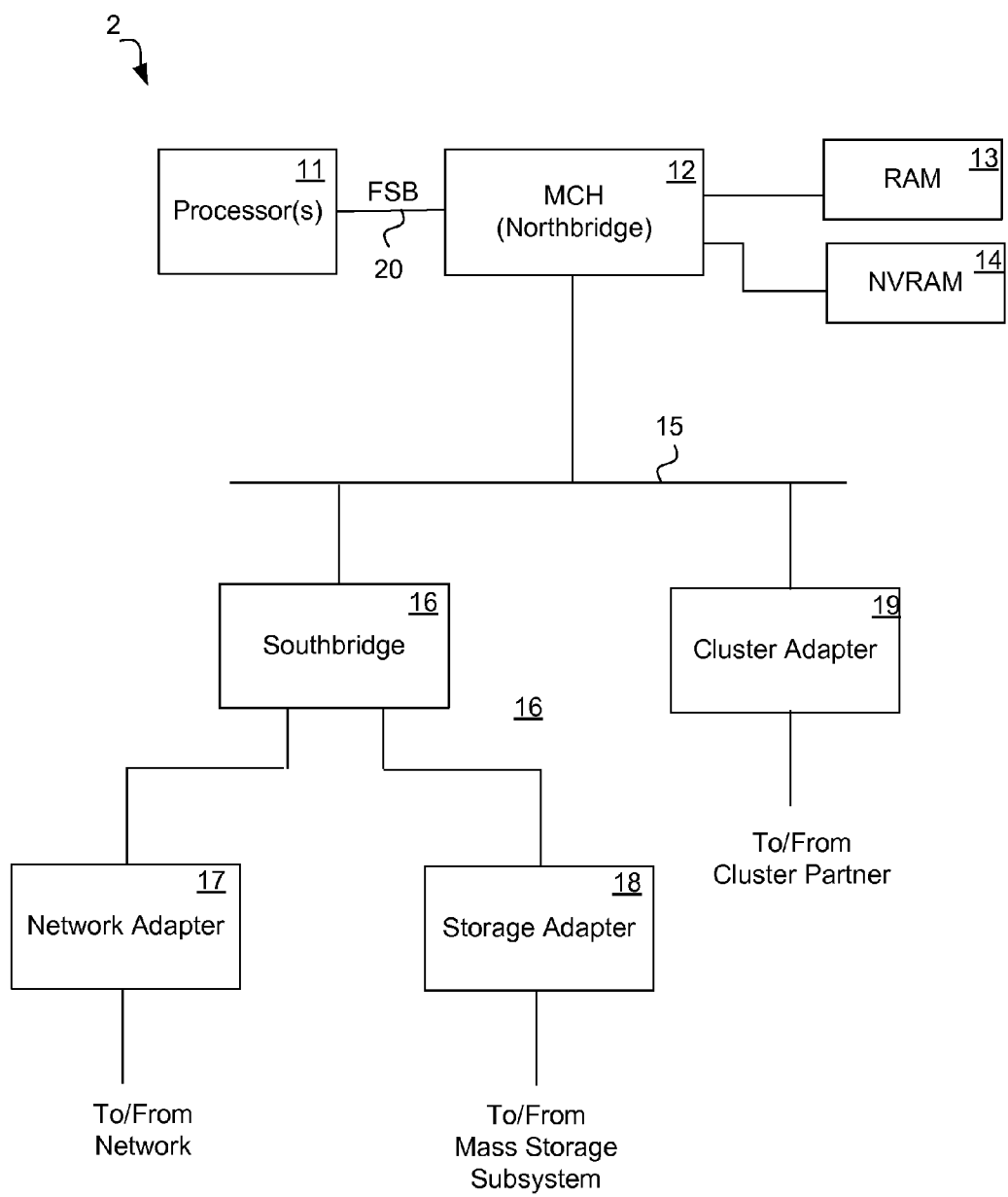
FIG. 1 illustrates a storage server in which the technique introduced here can be implemented.

FIG. 1 illustrates a storage server in which the technique introduced here can be implemented. The storage server 2 includes one or more processors 11, an MCH (a Northbridge) 12, random access memory (RAM) 13, NVRAM 14, an expansion bus 15, another controller hub (called the "Southbridge") 16, a network adapter 17, a storage adapter 18 and a cluster adapter 19. The processor(s) 11 are coupled to the RAM 13 and the NVRAM 14 via the MCH 12. The MCH 12 is coupled to the processor(s) 11 by a front side bus (FSB) 20. The MCH 12 also provides a connection between the processor(s) 11 and the expansion bus 15, which may be, for example, a bus from the peripheral component interconnect (PCI) family of standards. Also connected to the MCH 12 through the expansion bus 15 is the Southbridge 16. In other embodiments, it could be, for example, a version of a universal serial bus (USB), or any other type of peripheral component bus.

The network adapter 17 provides the storage server 2 with the ability to communicate with remote devices, such as storage clients, over an interconnect such as a local area network (LAN) and or a wide area network (WAN) and may be, for example, an Ethernet adapter or Fibre Channel adapter. The storage adapter 18 allows the storage server 2 to access a non-volatile mass storage subsystem, such as a set of disks. The cluster adapter 19 enables the storage server 2 to communicate with a separate storage server (not shown) that can function as a failover partner to the illustrated storage server 2.

In the illustrated embodiment, the Southbridge 16 connects the network adapter 17 and the storage adapter 18 to the expansion bus 15, while the cluster adapter 19 is directly connected to the expansion bus 15. Note, however, that other architectures are possible.

Figure 2:
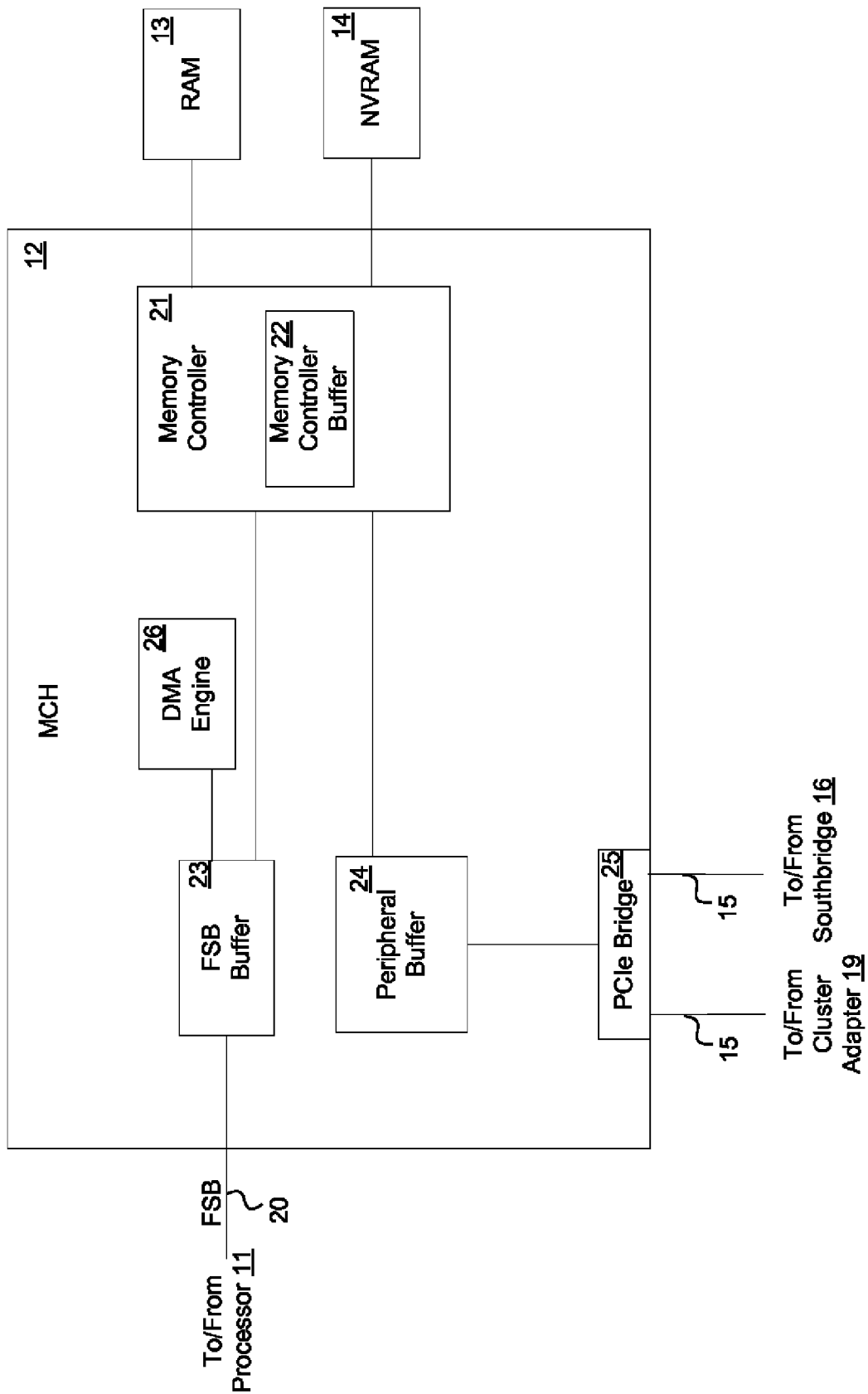
FIG. 2 illustrates the MCH in greater detail.

It is assumed that the MCH 12 does not guarantee that the ordering of data in transit (i.e., buffered) within it is maintained. FIG. 2, which illustrates the MCH 12 in greater detail, illustrates how this can be a problem. The MCH 12 includes a memory controller 21, which includes, among other things, a memory controller buffer 22. All data which enters the MCH 12 in which is destined for the RAM 13 or NVRAM 14 is at some point stored temporarily in the memory controller buffer 21. The MCH 12 also includes an FSB buffer 23, which receives any data transmitted to the MCH 12 across the FSB 20. The FSB buffer 23 is coupled to the memory controller 21.

The MCH 12 further includes a peripheral buffer 24 and (in the illustrated embodiment) a PCIe bridge 25. The peripheral buffer 24 receives any data transmitted to the MCH 12 across the expansion bus 15, e.g., from the Southbridge 16 (from network hosts or mass storage devices) or from the cluster adapter 19 (from a remote cluster partner). The PCIe bridge 25 couples the peripheral buffer 24 to the expansion bus 15. In the illustrated embodiment of FIG. 2, the expansion bus 15 is assumed to be a PCI Express (PCIe) bus, to facilitate explanation. In other embodiments, however, it may be a different type of interconnect.

The MCH 12 further includes a direct memory access (DMA) engine 26 coupled to the FSB buffer 23. The DMA engine 26 is used to copy data from RAM 13 to NVRAM 14, through the FSB buffer 23.

The FSB buffer 23 connects the processor's FSB 20 and the DMA engine 26 to the rest of the system. The PCIe bridge 25 connects the PCI bus(s) 15 to the peripheral buffer 24, and the peripheral buffer 24 connects the PCIe bridge 25 to the memory controller 21.

The memory controller buffer 22, FSB buffer 23 and peripheral buffer 24 all do not inherently guarantee that the ordering of data they store is maintained. During normal operation, this does not present a problem, since the data will have sufficient time to drain to NVRAM 14, where, when all of the data has arrived, the ordering will be correct. However, in the event of a power disruption to the system, data ordering and placement in NVRAM 14 can become corrupted. The technique introduced here, therefore, provides an efficient way of guaranteeing that such ordering and placement is preserved.

During normal operation of the storage server 2 (i.e., in the absence of a power disruption or other major fault), data is written to the NVRAM 14 without flushing the data to the NVRAM 14, in contrast with prior approaches to storing data in an NVRAM through an MCH. A consequence of not using any flushing during normal operation is that the data to be stored in the NVRAM 14 is presented to the hardware (e.g., the FSB 20, FSB buffer 23, memory controller 21, and NVRAM 14) in a continuous stream, without explicit separation of the individual data records, in contrast with prior approaches. Hence, the record structure is not visible to the hardware. This provides simpler, more efficient CPU operation.

In response to a power disruption in the storage server, first, all data sources in the storage server 2 that can either send data to NVRAM 14 out-of-order or otherwise interfere with another data source's pending write to NVRAM 14, are inhibited from initiating further transactions. In one embodiment, these data sources include the processor(s) 11, the network adapter 17, the storage adapter 18 and the cluster adapter 19. After all such data sources have been stopped, all pending write data within the MCH 12 is allowed to be committed to the NVRAM 14. The NVRAM 14 is then placed into ASR state by NVRAM control logic 31.

Figure 3:
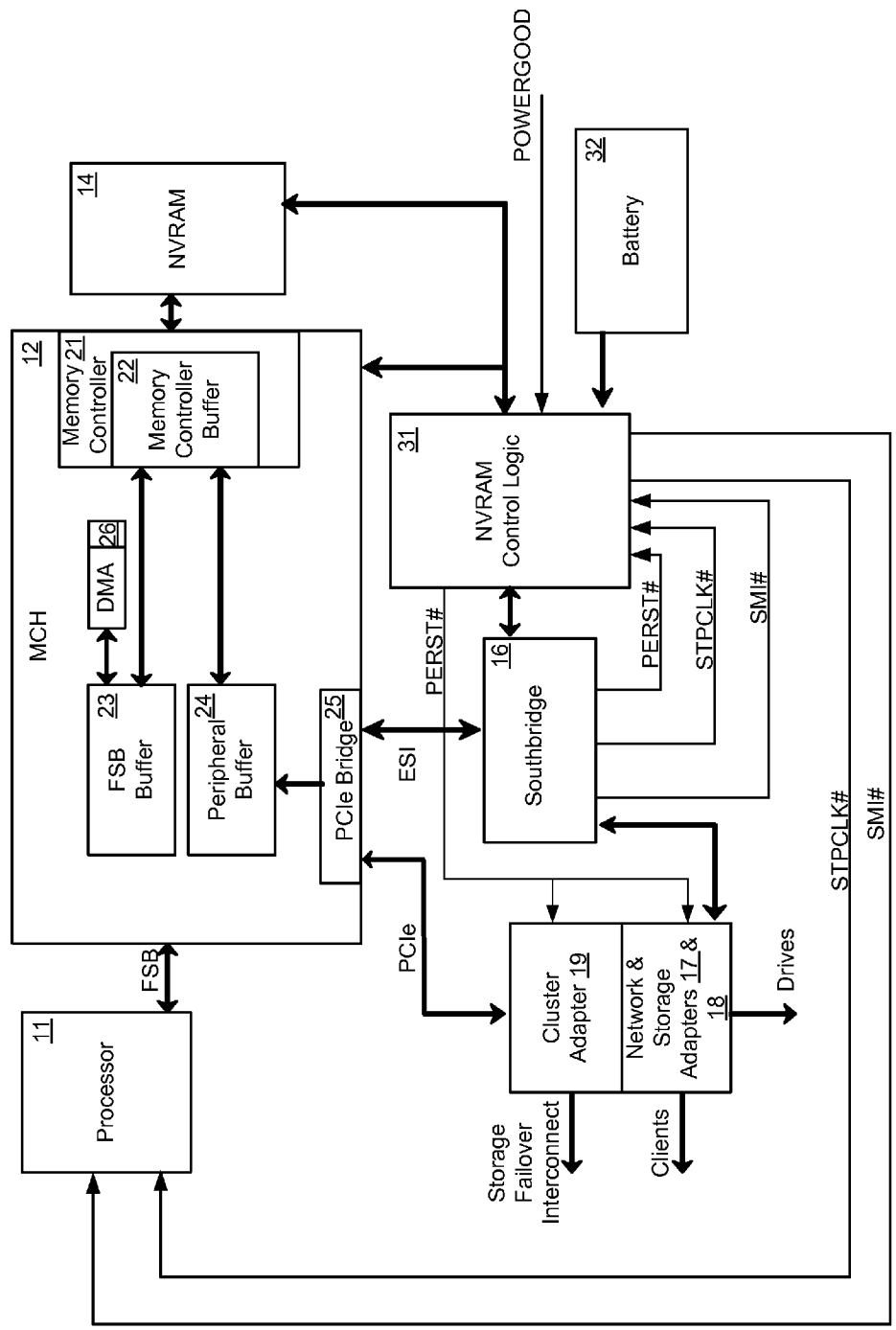
FIG. 3 illustrates the MCH and related elements in accordance with an embodiment of the technique introduced here.

In certain embodiments, the processor 11 is inhibited from initiating new read or write transactions, while allowing any of its pending transactions to complete, by asserting the Stop Clock (STPCLK#) signal or the System management interrupt (SMI#) signal to the processor 11. The STPCLK# and SMI# signals are well-known signals that are generated in most modern MCH chipsets, such as those made by INTEL Corporation. Normally, the STPCLK# and SMI# signals are provided directly from the Southbridge to the processor(s) and are typically used to place the processor(s) into a low-power "sleep" state, or perform critical management operations, respectively. However, in accordance with the technique introduced here, these signals are instead provided from the Southbridge 16 to NVRAM control logic 31, as shown in FIG. 3.

The NVRAM control logic 31 controls various functions relating to the NVRAM 14, such as monitoring system power (POWERGOOD signal) to determine when a power disruption has occurred, placing the NVRAM 14 in ASR state when appropriate, and providing an asynchronous refresh signal to the NVRAM 14 using power from the battery 32. In accordance with the technique introduced here, the NVRAM control logic normally just passes the STPCLK# and SMI# signals through unmodified to the processor. In addition, however, the NVRAM control logic 31 will cause one or both of those signals to be asserted when appropriate in response to detecting a power disruption. The NVRAM control logic 31 may be in the form of, for example, a complex programmable logic device (CPLD), application-specific integrated circuit (ASIC), or other conventional form of circuitry.

Peripheral devices, such as the network adapter 17, storage adapter 18 and cluster adapter 19, are inhibited from initiating new write transactions destined for the nonvolatile memory during a power disruption, in certain embodiments, by asserting the well-known PCI Express Reset (PERST#) signal to those devices. Normally PERST# is only asserted when the POWERGOOD signal from the system power supply (not shown) is not asserted. The exact requirements for assertion/unassertion of PERST# are defined by the relevant bus specification. For PCIe, for example, in the case of an unexpected power failure, PERST# is specified to be asserted no more than 500 nsec after power is no longer stable. With the technique introduced here, however, PERST# is to be asserted in such a case well before power is no longer stable, so that the data may drain to the NVRAM 14. The exact amount of time at which PERST# should be asserted before power becomes unstable is implementation-specific.

In certain embodiments, after all data sources have been quiesced, all data buffered within the MCH 12 is allowed simply to drain to the NVRAM 14, before placing the NVRAM 14 into ASR state. This approach works when all data storage elements within the MCH 12 (e.g., the FSB buffer 23, peripheral buffer 24 and memory controller buffer 22) are designed to eventually output their contents to downstream elements without explicit flushing. In other embodiments, however, that might not necessarily be the case. For example, one or more of these buffers, such as the peripheral buffer 24, might be replaced in certain embodiments by a cache or other elements that can hold data indefinitely. In that case, it may be necessary to flush the contents of such cache or other elements to the NVRAM 14 after the data sources have been shut down and before placing the nonvolatile memory into ASR state.

Regardless of whether flushing is used in response to a power disruption, this overall approach is more efficient than known prior techniques, since there is no need to flush data during normal operation. Further, this approach can be used to guarantee that data ordering and placement is preserved for all data in transit to the NVRAM 14 in the event of the power disruption.

In the embodiment described above, the processor 11, network adapter 17, storage adapter 18 and cluster adapter 19 are the only potential sources of write data destined for the NVRAM 14. In other embodiments, however, there may be other sources of data destined for NVRAM; in such embodiments, the technique should be modified to ensure that those sources are similarly handled. That is, provisions should be made so that in the event of a power disruption, such sources would be quiesced and any pending write data from those sources would be allowed to transfer to the NVRAM before placing the NVRAM in ASR state.

Figure 4:
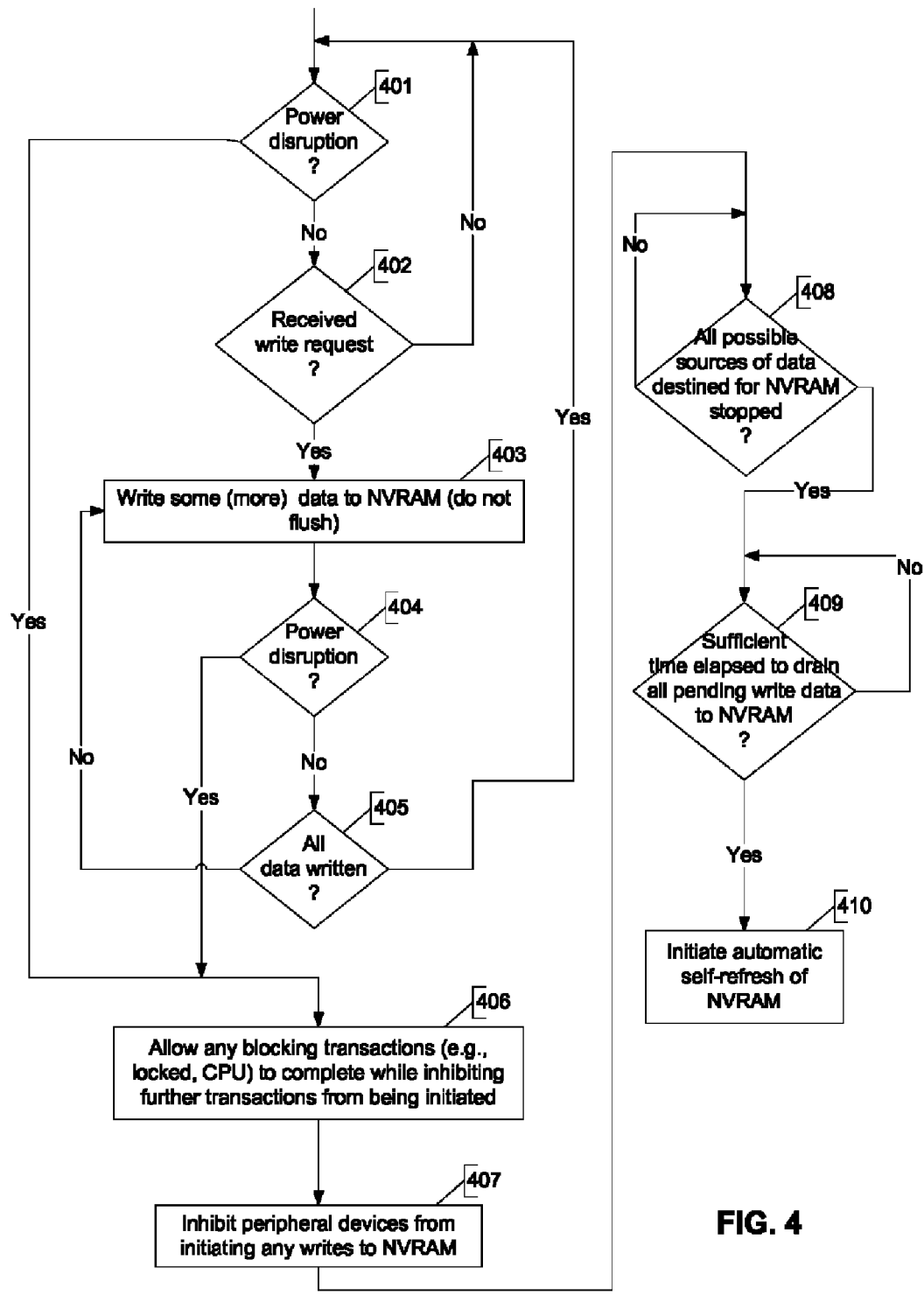
FIG. 4 is a flow diagram illustrating a process for processing write transactions and handling a power disruption, in accordance with an embodiment of the technique introduced here.

FIG. 4 illustrates a process for processing write transactions and handling power disruption, in accordance with an embodiment of the technique introduced here. The process can be carried out by one or more of the component's illustrated in FIG. 3. Initially, at 401 the process determines whether a system power disruption has been detected. If a system power disruption has been detected, the process jumps to 406, described below. If no system power disruption has been detected, the process proceeds to 402, where is determined whether a write request has been received by the storage server 2. If no write request has been received, the process loops back to 401.

If a write request has been received, the process proceeds to 403, by initiating writing of the data in the write request, and associated metadata, to the NVRAM 14. The metadata can include, for example, descriptions of what information is stored in what locations of the NVRAM 14, including identification data, record lengths, and error-detection/correction codes. This operation (403) may be carried out by a storage operating system in the storage server 2. Note that this operation does not involve a flush operation, in contrast with prior known techniques of writing to NVRAM 14.

In the event a power disruption occurs (404) while writing data or metadata to the NVRAM 14 in 403, the process jumps to 406, described below. Otherwise, once all of the data and associated metadata has been written to NVRAM 14 (405), the process loops back to 401, described above.

In the event of a power disruption, at 406 the process allows any pending blocking transactions against the NVRAM 14 to complete, while inhibiting any further transactions from being initiated. This includes transactions initiated by the processor 11 that assert the LOCK# signal on the FSB 20. In certain embodiments, this operation (406) is accomplished by assertion of the STPCLK# signal or the SMI# signal, as noted above, which causes the processor 11 to be quiesced.

Next, at 407 the process inhibits any peripheral devices that are potential sources of write data to the NVRAM 14 (e.g., network adapter 17, storage adapter 18 and cluster adapter 19) from initiating any additional writes to the NVRAM 14. This can be accomplished by assertion of the PERST# signal to all such devices, as noted above.

After all possible sources of data destined for the NVRAM 14 have been quiesced (408), the process determines at 409 whether sufficient time has elapsed for all pending write data to have drained to the NVRAM 14. This assumes an embodiment in which, by design, all data that can pass through the MCH 12 will eventually drain to the NVRAM 14 even without flushing. As noted above, in other embodiments a flushing operation may be required in this circumstance. The amount of time needed to ensure all data in the MCH 12 has drained to the NVRAM 14 is implementation-specific and can be determined at design time. Once sufficient time has elapsed, the process initiates ASR of the NVRAM 14 at 410.

Figure 5:
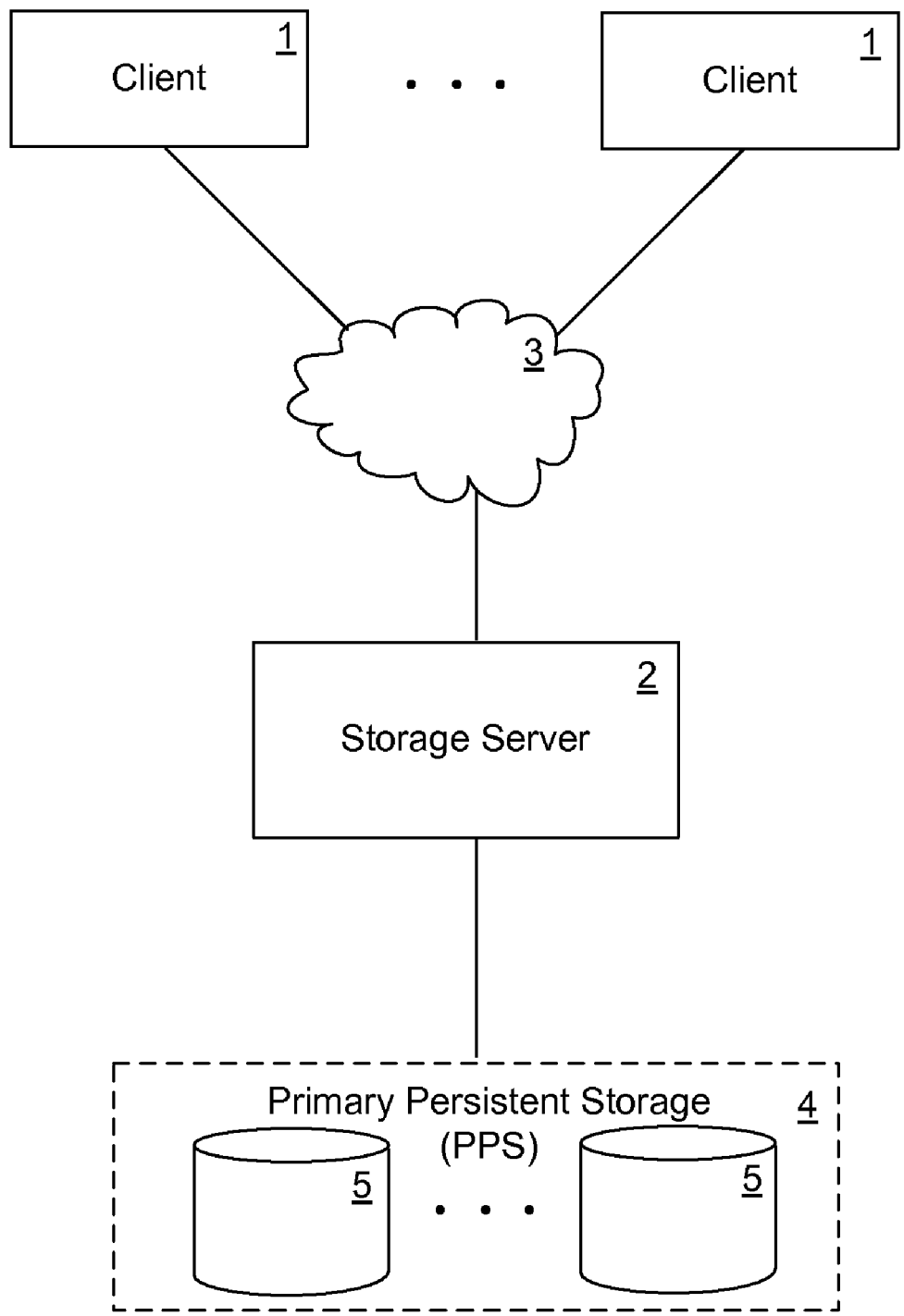
FIG. 5 shows a network storage system in which the technique introduced here can be implemented.

FIG. 5 shows a network storage system in which the technique can be implemented. Note, however, that the technique is not necessarily limited to storage servers or network storage systems. In FIG. 1, the storage server 2 is coupled to a primary persistent storage (PPS) subsystem 4 and is also coupled to a set of clients 1 through an interconnect 3. The technique introduced above can be implemented in the storage server 2 and/or any of the clients 1.

The interconnect 3 may be, for example, a LAN, wide WAN, metropolitan area network (MAN), global area network such as the Internet, a Fibre Channel fabric, or any combination of such interconnects. Each of the clients 1 may be, for example, a conventional personal computer (PC), server-class computer, workstation, handheld computing/communication device, or the like.

Storage of data in the PPS subsystem 4 is managed by the storage server 2. The storage server 2 receives and responds to various read and write requests from the clients 1, directed to data stored in or to be stored in the storage subsystem 4. The PPS subsystem 4 includes a number of nonvolatile mass storage devices 5, which can be, for example, conventional magnetic or optical disks or tape drives; alternatively, they can be non-volatile solid-state memory, such as flash memory, or any combination of such devices. The mass storage devices 5 in PPS subsystem 4 can be organized as a Redundant Array of Inexpensive Disks (RAID), in which case the storage server 2 accesses the storage subsystem 4 using a RAID algorithm for redundancy.

The storage server 2 may provide file-level data access services to clients 1, such as commonly done in a NAS environment, or block-level data access services such as commonly done in a SAN environment, or it may be capable of providing both file-level and block-level data access services to clients 1. Further, although the storage server 2 is illustrated as a single unit in FIG. 5, it can have a distributed architecture. For example, the storage server 2 can be designed as a physically separate network module (e.g., "N-blade") and disk module (e.g., "D-blade") (not shown), which communicate with each other over a physical interconnect. Such an architecture allows convenient scaling, such as by deploying two or more N-modules and D-modules, all capable of communicating with each other through the interconnect.

The storage server 2 includes a storage operating system (not shown) to control its basic operations (e.g., reading and writing data in response to client requests). In certain embodiments, the storage operating system is implemented in the form of software and/or firmware stored in one or more storage devices in the storage server 1.

The techniques introduced above can be implemented in software and/or firmware in conjunction with programmable circuitry, or entirely in special-purpose hardwired circuitry, or in a combination of such embodiments. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:
1. A method comprising:
  causing data to be written to a nonvolatile memory through a subsystem of a network storage server without flushing the data to the nonvolatile memory, during normal operation of the network storage server, wherein the subsystem does not guarantee that the ordering of the data is maintained; and responding to a power disruption in the network storage server by inhibiting a first data source in the network storage server, that can initiate write transactions destined for the nonvolatile memory, from initiating write transactions destined for the nonvolatile memory, and allowing pending write data within the subsystem to be committed to the nonvolatile memory, and then placing the nonvolatile memory into a self-refresh state.

2. A method as recited in claim 1, wherein data is stored the nonvolatile memory in a stream, without explicit separation of individual records in the data.

3. A method as recited in claim 1, wherein the subsystem is a memory controller hub.

4. A method as recited in claim 3, wherein the first data source is a processor of the network storage server, and wherein inhibiting the first data source from initiating write transactions destined for the nonvolatile memory comprises:

asserting a first signal to prevent the processor from initiating new read or write transactions while enabling pending processor transactions to complete.

5. A method as recited in claim 4, wherein responding to the power disruption in the network storage server further comprises:

inhibiting a peripheral device in the network storage server, that can initiate write transactions destined for the nonvolatile memory, from initiating write transactions destined for the nonvolatile memory, by asserting a second signal, wherein the peripheral device is coupled to the memory controller hub via a peripheral bus in the network storage server.

6. A method as recited in claim 5, wherein allowing pending write data within the subsystem to be committed to the nonvolatile memory comprises:

flushing pending write data from the peripheral device to the nonvolatile memory.

7. A method as recited in claim 5, wherein allowing pending write data within the subsystem to be committed to the nonvolatile memory comprises:

waiting a predetermined period of time for pending write data from the peripheral device to be committed to the nonvolatile memory.

8. A method as recited in claim 5, wherein:

the first signal is a Stop Clock signal or a System Management Interrupt signal; and the second signal is a peripheral bus reset signal.

9. A method as recited in claim 5, wherein the peripheral device is a PCI-family device.

10. A method of operating a network storage server, the method comprising:

during a period of normal operation of the network storage server, receiving at the network storage server a plurality of client initiated requests to write data to a storage facility, and in response to the requests, initiating operations that cause data specified by the requests and associated metadata to be written to a nonvolatile memory in the network storage server without flushing the data or metadata to the nonvolatile memory;

detecting a power disruption in the network storage server; and in response to detection of the power disruption, inhibiting a plurality of data sources in the network storage server that can initiate write transactions destined for the nonvolatile memory from initiating write transactions destined for the nonvolatile memory, and allowing all pending write data within a subsystem of the network storage server to be transferred to the nonvolatile memory, and then placing the nonvolatile memory into a self-refresh state.

11. A method as recited in claim 10, wherein data specified by the write requests is stored the nonvolatile memory in a stream, without explicit separation of individual records in the data.

12. A method as recited in claim 10, wherein the subsystem is a memory controller hub.

13. A method as recited in claim 12, wherein inhibiting a plurality of data sources from initiating write transactions destined for the nonvolatile memory comprises:

asserting a first signal to prevent a processor of the network storage server from initiating new read or write transactions while enabling pending processor transactions to complete; and asserting a second signal to prevent a peripheral device coupled to the memory controller hub from initiating new write transactions directed to the nonvolatile memory.

14. A method as recited in claim 13, wherein allowing all pending write data within a subsystem of the network storage server to be transferred to the nonvolatile memory comprises:

flushing data from the peripheral device to the nonvolatile memory.

15. A method as recited in claim 14, wherein allowing all pending write data within a subsystem of the network storage server to be transferred to the nonvolatile memory comprises:

waiting a predetermined period of time for pending write data within the memory controller hub to be transferred to the nonvolatile memory.

16. A method as recited in claim 13, wherein:

the first signal is a Stop Clock signal or a System Management Interrupt signal; and the second signal is a peripheral bus reset signal.

17. A method as recited in claim 13, wherein the peripheral device is a PCI-family device.

18. A method of preserving the ordering of data destined for a nonvolatile memory in a network storage server, in the event of a power disruption, the method comprising:

receiving a plurality of write requests at the network storage server, and writing data representing the write requests to the nonvolatile memory within a memory controller hub in the network storage server without flushing the data to the nonvolatile memory, wherein an ordering of the data is not guaranteed to be maintained by the memory controller hub while the data is within the memory controller hub, and wherein data specified by the write requests is stored the nonvolatile memory in a stream, without explicit separation of individual records in the data; and in response to detecting the power disruption in the network storage server, asserting a first signal to prevent a processor of the network storage server from initiating new read or write transactions while allowing completion of pending processor transactions;

asserting a second signal to prevent a peripheral device coupled to the memory controller hub from initiating new write transactions directed to the nonvolatile memory; and after waiting a predetermined period of time for pending write data within the memory controller hub to be committed to the nonvolatile memory, placing the nonvolatile memory into a self refresh state.

19. A method as recited in claim 18, wherein the first signal is a Stop Clock signal.

20. A method as recited in claim 18, wherein the first signal is a System Management Interrupt signal.

21. A method as recited in claim 18, wherein the second signal is a peripheral bus reset signal.

22. A method as recited in claim 21, wherein the peripheral device is a PCI-family device.

23. A method as recited in claim 10, wherein:
the first signal is a Stop Clock signal or a System Management Interrupt signal; and
the second signal is a peripheral bus reset signal.

24. A method as recited in claim 23, wherein the peripheral device is a PCI-family device.

25. A processing system comprising:
a memory subsystem which includes a nonvolatile memory; and
a plurality of units, including a processor, each of which can initiate write transactions destined for the nonvolatile memory, wherein the write transactions cause data to be written to the nonvolatile memory without flushing the data to the nonvolatile memory;
wherein the memory subsystem is responsive to a power disruption in the processing system by
inhibiting the plurality of units from initiating write transactions destined for the nonvolatile memory, and
allowing all pending write data within the memory subsystem to be transferred to the nonvolatile memory, and then placing the nonvolatile memory into a self-refresh state.

26. A processing system as recited in claim 25, wherein the pending write data and the data specified by the write transactions are stored the nonvolatile memory in a stream, without explicit separation of individual records in the data.

27. A processing system as recited in claim 25, wherein the processing system is a network storage server.

28. A processing system as recited in claim 25, wherein the memory subsystem is a memory controller hub.

29. A processing system as recited in claim 28, wherein the processing system is a network storage server.

30. A processing system as recited in claim 28, wherein the memory controller hub comprises:
a memory control unit buffer; and
a plurality of additional buffers coupled to the memory control unit buffer;
the processing system further comprising control logic to respond to a power disruption in the processing system by
inhibiting the plurality of units from initiating write transactions destined for the nonvolatile memory, and
allowing all pending write data in the memory control unit buffer and the plurality of additional buffers to be transferred to the nonvolatile memory, and then placing the nonvolatile memory into a self-refresh state.

31. A processing system as recited in claim 25, wherein inhibiting the plurality of units from initiating write transactions destined for the nonvolatile memory comprises:

asserting a first signal to prevent the processor from initiating new read or write transactions while enabling pending write transactions by the processor to complete; and
asserting a second signal to prevent a peripheral device coupled to the memory subsystem from initiating new write transactions directed to the nonvolatile memory.

32. A processing system as recited in claim 31, wherein:
the first signal is a Stop Clock signal or a System Management Interrupt signal; and
the second signal is a peripheral bus reset signal.

33. A processing system as recited in claim 31, wherein the peripheral device is a PCI-family device.

34. A network storage server comprising:
a nonvolatile memory;
a processor that can initiate write transactions destined for the nonvolatile memory, which cause data to be written to the nonvolatile memory without flushing the data to the nonvolatile memory;
a plurality of peripheral devices coupled to the processor;
a storage interface through which to access a plurality of nonvolatile mass storage devices;
a network interface through which to communicate with a plurality of storage clients over a network;
a memory controller hub coupled to the processor and the plurality of peripheral devices, including a memory control unit buffer, and a plurality of additional buffers coupled to the memory control unit buffer; and
control logic to respond to a power disruption by
inhibiting the processor and the peripheral devices from initiating write transactions destined for the nonvolatile memory, and
allowing all pending write data in the memory control unit buffer and the plurality of additional buffers to be committed to the nonvolatile memory, and then placing the nonvolatile memory into a self-refresh state.

35. A network storage server as recited in claim 34, wherein data is stored the nonvolatile memory in a stream, without explicit separation of individual records in the data.

36. A network storage server as recited in claim 35, wherein inhibiting the processor and the peripheral devices from initiating write transactions destined for the nonvolatile memory comprises:
asserting a first signal to prevent the processor from initiating new read or write transactions while enabling pending write transactions by the processor to complete; and
asserting a second signal to prevent the peripheral devices from initiating new write transactions directed to the nonvolatile memory.

37. A network storage server as recited in claim 36, wherein:
the first signal is a Stop Clock signal or a System Management Interrupt signal; and
the second signal is a peripheral bus reset signal.

38. A network storage server as recited in claim 37, wherein the plurality of peripheral devices comprise a PCI-family device.

* * * * *